Aug. 10, 1948.  J. T. DICKSON  2,446,694
PRESSURE ACTUATOR FOR BRAKES
Filed Sept. 4, 1944
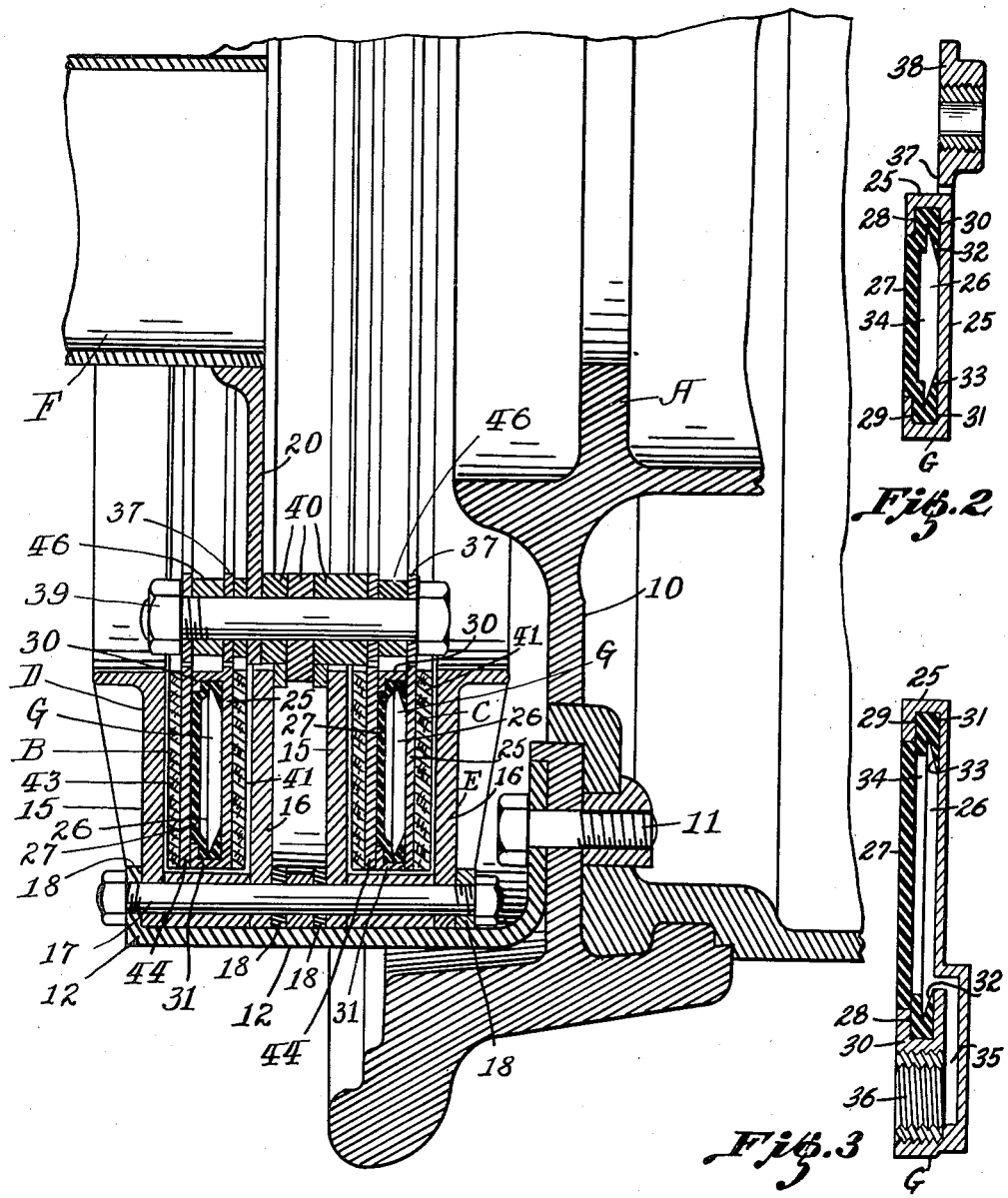
Inventor:
James T. Dickson,
by: (signature)
Attorney.

Patented Aug. 10, 1948

2,446,694

UNITED STATES PATENT OFFICE 2,446,694

PRESSURE ACTUATOR FOR BRAKES

James T. Dickson, Los Angeles, Calif.

Application September 4, 1944, Serial No. 552,707

4 Claims. (Cl. 137—157)

This invention relates to a fluid actuated pressure actuator for controlling the operation of a rotary brake or torque transmitter. An object of the invention when used to control the operation of a brake is to bring an airplane or other type of power propelled vehicle or device to a quick but gradual stop. An object when the invention is used as an actuator for a brake or torque transmitter is to gradually but positively cause a driven rotary element to revolve equally with a driving rotary element. A further object is to provide a device of its kind which is simple in construction and which can when operated be instantly applied or set as gradually as desired to retard motion or transmit power and in which the work contact is applied evenly at all points to effectively distribute friction or transmit energy with a minimum of wear. A still further object is to provide an improved fluid propelled applicator for operating the friction element or elements of certain mechanical devices which is not liable to get out of order or deteriorate, is extremely simple and effective in use, can be easily replaced when desired, will hold the friction elements of a device set without losing power and is not subject to excessive heating.

These and other objects, and the corresponding accomplishments and features of my invention will be best understood from the following description of a specific form of the device as applied to a brake that embodies the invention, reference for this purpose being had to the accompanying drawings in which Fig. 1 is a vertical central section of a detail of a wheel to which my improved invention is shown applied as a brake; Fig. 2 is a cross sectional view through a portion of the applicator including a portion of one of its spring supporting arms 37, and Fig. 3 is another cross sectional view through a portion of the applicator including a portion of its union 36.

In the drawings, A indicates part of the hub portion of a revoluble wheel upon which the ordinary wheel (not shown) carrying a pneumatic tire is adapted to be mounted in the usual manner, said hub portion being provided with a radiating flange unit 10 to the side of which is secured by any suitable means, such as bolts 11, a cylindrical housing 12 which is coaxial with the wheel. In practice any desired number of the brake units may be applied to the wheel, the drawing illustrating two such units B and C. These units are provided with brake receiving cells D and E, the two cells being substantially similar in construction. Each cell is composed of a pair of inwardly extending parallel annular friction plates 15 and 16, suitably spaced apart to receive the brake units and mounted within and on the brake housing by longitudinal bolts such as 17 which may be circumferentially spaced apart at suitable intervals and secured through bosses 18, said bosses being integral with the housing. All of said plates are thus rigidly assembled in the housing and revolve coaxially with the wheel but are detachably secured, whereby the brake assembly may easily be mounted or demounted for adjusting and repairing. In this manner a pair of annular channels is provided within the brake housing, the inner side walls of each channel functioning as friction engaging faces for my improved applicators.

F indicates a portion of an ordinary stationary axle housing upon which the brake applying means is shown, said axle housing being coaxial with the wheel and provided with a suitable stationary brake unit radiating support 20 resembling a circular flange. The brake applying means as shown consists of two stationary units B and C, which are similar in construction. Each of said units employs my improved fluid pressure applicator G which resembles a substantially flat annulus 25, within each brake receiving cell, one exterior side of which is substantially flat and the opposite side provided with a shallow broad annular groove 26 in which a corresponding flat, annular, elastic, self sealing, and fluid pressure applying band 27 is seated. The radial inner and outer edges of the groove are mortised to provide inner and outer sealing channels 28 and 29 (see Figs. 2 and 3) and the elastic band is provided with corresponding inner and outer annular tongues 30 and 31, in close fitting engagement in said channels to hold the band in the applicator. The inner portions of the tongues 30 and 31 are also formed with annular tapering self sealing flaps 32 and 33, which with the tongues seal the band in the applicator to prevent pressure fluid from leaking out of the chamber 34 between the band 27 and annulus 25 when the applicator is inflated. In this manner the greater the pressure exerted by the inflation fluid the tighter the seal. An inwardly extending duct 35, connecting with the chamber 34 through the body of the applicator terminates in a union 36 by which a source of fluid pressure can be applied for controlling the operation of the applicator. Either or both applicators can be employed for applying braking action. The annulus 25 is supported by inner flexible arms such as 37, the outer passaged ends of which are adapted to be secured to the annular support 20 by bolts such as 39 (see Fig. 1) and suitable spacers 40, said fastening means being suitably spaced circumferentially to provide a substantial mounting for the brake applicator units. The portions of the inner and outer applicators G containing the unions 36 may also be suitably spaced circumferentially apart to provide convenient coupling means for the connection of controlling fluid to the applicators. It will be noted that single bolt connections 39 function for securing both brake applicator units on the supporting flange 20. The body of the applicator may be made out of light weight metal to advantage or any other suitable material.

A suitable friction disc 41 is secured by cementing or other suitable means upon the flat side of the applicator annulus and functions against the inner surface of the companion friction plate 16. A corresponding friction disc 43 is secured to a freely movable supporting disc 44 by cementing or other suitable means, and functions against the inner surface of the companion friction plate 15. The supporting discs 44 are movably held by the flexible arms, such as 46 (see Fig. 1), and by the supporting bolts such as 39 so that when fluid medium is forced into the chambers 34 the friction discs 41 and 43 are urged apart against the friction plates 16 and 15 to apply braking action or transmit torque when the device is employed as a torque converter. The flexible members 46 for the supporting discs 44 may resemble the flexible deforming arms 37 employed in the fluid pressure applicator G. The flexible supporting means for the applicator G and the supporting discs 44 sustain the friction discs normally out of contact with the cooperating friction faces of the revoluble friction plates 15 and 16.

It will be understood that the parts described in connection with one of the brake applicator units is substantially duplicated in the companion unit and that the two units can be operated independently or together as desired to apply part of or the entire braking power available.

An important feature of the inventon is the self sealing of the elastic band 27 in the rigid applicator annulus 25, whereby when the applicator is subjected to the action of fluid pressure injected into the inflation bands, the friction elements are set without any loss of power due to the leaking of fluid. The inflation band resists wear, is extremely simple and can easily be removed and replaced when desired. It can be composed of rubber, neoprene or any other suitable elastic or flexible material desired. The entire applicator is confined to extremely thin dimensions which is an advantage. When used for transmitting torque the applicator is of substantially the same construction as described, the driving and driven elements of a couple being actuated through the application of fluid pressure in substantially the same manner as when used for applying braking action by actuating friction elements. Therefore the friction engaging surfaces of a brake are for the purpose of this invention to be considered the equivalent of torque transmitting surfaces of a clutch or any instrumentality in which rotors are caused to connect for conveying or influencing motion.

In accordance with the patent statues, I have described the principles of operation of my invention together with the construction thereof which I now consider to represent the best embodiment thereof but I desire to have it understood that the construction shown is only illustrative and that the invention can be carried out by other means and applied to uses other than those above set forth within the scope of the following claims.

I claim:

1. A fluid motor for actuating a brake, comprising, two cooperative elements, one a rigid disc having a broad shallow annular groove in its face bounded by a pair of inner and outer marginal mortise channels, and the other a resilient substantially flat annulus corresponding substantially in cross section with and normally seated in and generally spaced from the bottom of said groove, said annulus also having its inner and outer concentric marginal edges seated in said mortise channels and having reverting flaps forming self sealing joints between said elements, and a fluid induction duct connected between said discs.

2. A fluid motor for actuating a brake, comprising, two cooperating elements, one a rigid disc having a broad shallow annular groove in its face bounded by a pair of inwardly facing marginal mortise channels, and the other a broad annular resilient band corresponding with and normally seated in and generally spaced from the bottom of said groove, said band also having its inner and outer concentric marginal edges formed with a pair of annular tongues and reverting flaps producing self sealing joints when the resilient disc is inflated, and an inflation fluid induction duct connected between said discs.

3. In a fluid motor for actuating a brake, a rigid disc provided with a wide shallow groove in its outer side surface bounded by concentric marginal clinching channels facing inwardly and a relatively broad thin elastic band corresponding substantially in cross section with and normally seated in said groove and having its outer surface normally substantially flush with the outer side surface of the rigid disc and its inner and outer margins formed with a pair of inwardly and outwardly extending concentric tongues with reverting flaps in clinching engagement with the rigid disc in said channels to provide self sealing inner and outer marginal joints between said discs, said band being generally spaced from the bottom of said groove, and said rigid disc also provided with a fluid duct connected between the adjacent faces of said disc and band.

4. In a fluid actuated device, an actuating element for expanding rotary transmitting surfaces into cooperative engagement, comprising a rigid supporting disc body having a broad annular channel in its face bounded by inner and outer grooves, an elastic disc seated in said channel and having tongues projecting into said grooves to form tongue and groove joints, said body and disc forming an inflation chamber to exert expansible side pressure, and said tongues having supplemental self sealing means to assure fluid tight joints between the body and elastic disc, and a fluid induction duct entering said body.

JAMES T. DICKSON.

REFERENCES CITED

The following references are of record in the file of this patent:

UNITED STATES PATENTS

| Number | Name | Date |
| --- | --- | --- |
| 2,174,635 | Linderman | Oct. 3, 1939 |
| 2,181,988 | Davis | Dec. 5, 1939 |
| 2,199,785 | Dickson | May 7, 1940 |

FOREIGN PATENTS

| Number | Country | Date |
| --- | --- | --- |
| 3,742 | France | Dec. 16, 1904 |
| (Addition to No. 328,360) | | |